United States Patent
Asai (10) Patent No.: US 10,145,693 B2
(45) Date of Patent: Dec. 4, 2018

(54) OWN-POSITION ESTIMATION DEVICE AND OWN-POSITION ESTIMATION METHOD (71) Applicant: Nissan Motor Co., Ltd., Yokohama-shi, Kanagawa (JP)

(72) Inventor: Toshihiro Asai, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/743,853

(22) PCT Filed: Jul. 13, 2015

(86) PCT No.: PCT/JP2015/070008
§ 371 (c)(1),
(2) Date: Jan. 11, 2018

(87) PCT Pub. No.: WO2017/009923
PCT Pub. Date: Jan. 19, 2017

(65) Prior Publication Data
US 2018/0202815 A1    Jul. 19, 2018

(51) Int. Cl.
*G01C 21/30* (2006.01)
*G01C 21/36* (2006.01)
*G01S 5/16* (2006.01)
*G06K 9/00* (2006.01)
*G06T 7/73* (2017.01)
*G01C 21/00* (2006.01)
*G01C 21/04* (2006.01)

(52) U.S. Cl.
CPC ........... *G01C 21/30* (2013.01); *G01C 21/005* (2013.01); *G01C 21/04* (2013.01); *G01C 21/3602* (2013.01); *G01S 5/16* (2013.01); *G06K 9/00798* (2013.01); *G06T 7/74* (2017.01); *G06T 2207/30252* (2013.01)

(58) Field of Classification Search
CPC ...... G01C 21/30; G01C 21/005; G01C 21/04; G06T 7/74; G06T 2207/30252
See application file for complete search history.

(56) References Cited

U.S. PATENT DOCUMENTS

2012/0239239 A1    9/2012  Suyama
2018/0045516 A1*   2/2018  Sumizawa ........... G01C 21/005

FOREIGN PATENT DOCUMENTS

| JP | 2007303841 A | 11/2007 |
| JP | 2008250906 A | 10/2008 |
| JP | 2012194860 A | 10/2012 |
| JP | 2013068482 A | 4/2013 |
| JP | 2013156034 A | 8/2013 |

* cited by examiner

*Primary Examiner* — Michael D Lang
(74) *Attorney, Agent, or Firm* — Young Basile Hanlon & MacFarlane, P.C.

(57) ABSTRACT

An own-position estimation device: detects positions of landmarks present around a vehicle; accumulates the detected positions of the landmarks as landmark position data based on a movement amount of the vehicle; extracts straight lines from the accumulated landmark position data; selects pieces of the landmark position data used for own-position estimation based on angles formed by intersecting ones of the extracted straight lines; and estimates a position of the vehicle by matching the selected pieces of the landmark position data and positions of landmarks in map information.

6 Claims, 8 Drawing Sheets

TIME t1

FIG. 5B

TIME t2

FIG. 5C

TIME t3

FIG. 5D

TIME t4

| STRAIGHT LINE | OBTAINED TIME |
|---|---|
| a | t1 |
| b | t2 |
| c | t3 |
| d | t4 |
| e | t5 |

FIG. 11

| ORDER OF PRIORITY | COMBINATION | ANGLE |
|---|---|---|
| 1 | a,b | 90 |
| 1 | b,d | 90 |
| 3 | a,e | 75 |
| 3 | b,e | 75 |
| 5 | c,b | 60 |
| 6 | c,e | 45 |
| 7 | a,c | 30 |
| 7 | b,c | 30 |
| 9 | e,d | 15 |
| 10 | a,b | 0 |

FIG. 12

| ORDER OF PRIORITY | STRAIGHT LINE |
|---|---|
| 1 | d(t2<t4) |
| 2 | b(t1<t2) |
| 3 | a |
| 4 | e |
| 5 | c |

OWN-POSITION ESTIMATION DEVICE AND OWN-POSITION ESTIMATION METHOD

TECHNICAL FIELD

The present invention relates to an own-position estimation device and an own-position estimation method which estimate the position of a vehicle.

BACKGROUND

There is known a method of estimating the position of a vehicle by matching map information and information detected by sensors such as a camera and a range finder. The accuracy of the own-position estimation can be improved by using map information with three-dimensional information, but this method has problems of an increase in the cost of creating the map information and an increase in the processing load of the own position estimation. Meanwhile, there is proposed a technique in which a mobile body estimates the position of itself by using map information having information on landmarks described as two-dimensional information (see Japanese Patent Application Publication No. 2008-250906). Such a technique can reduce the cost of creating the map information and the processing load of the own-position estimation.

However, the technique described in Japanese Patent Application Publication No. 2008-250906 is based on the premise that the information obtained by the sensors and matched with the map information for the own-position estimation is information obtained within a predetermined distance from the latest own position. In this case, when a linear route continues for a predetermined distance or more and the information on the landmark is described as a straight line parallel to the route, there is a certain degree of freedom in the direction along the straight line and this may cause a decrease in accuracy of the own-position estimation.

SUMMARY

In view of the problems described above, an object of the present invention is to provide an own-position estimation device and an own-position estimation method which can improve the accuracy of own-position estimation.

An own-position estimation device selects, based on angles formed by intersecting lines among straight lines obtained by using landmarks therearound, pieces of landmark position data to be used for own-position estimation, and matches the selected pieces of landmark position data and the positions of the landmarks in map information to estimate the position of the vehicle.

The present invention can provide the own-position estimation device and the own-position estimation method which can improve the accuracy of the own-position estimation by selecting, based on the angles formed by the intersecting straight lines among the straight lines obtained by using landmarks therearound, pieces of landmark position data to be used for the own-position estimation, the pieces of data to be used in the own-position estimation.

DETAILED DESCRIPTION OF THE EMBODIMENTS

An embodiment of the present invention is described with reference to the drawings. In the description of the drawings, the same or similar parts are denoted by the same or similar reference numerals and overlapping description is omitted.

Figure 1:
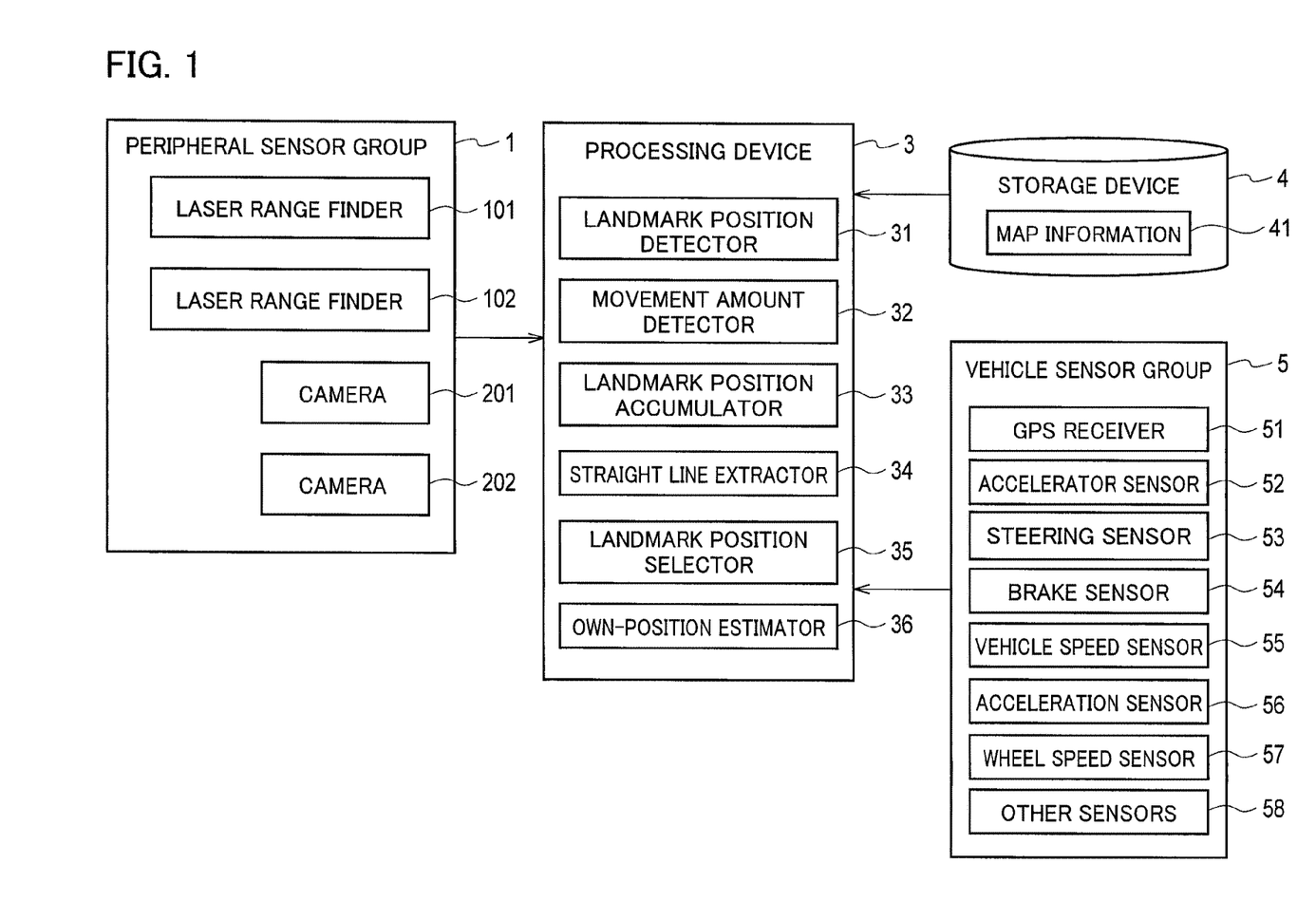
FIG. 1 is a block diagram explaining an example of a configuration of an own-position estimation device according to an embodiment of the present invention.

(Own-position Estimation Device) FIG. 1 is a view explaining a configuration of an own-position estimation device according to the embodiment. The own-position estimation device according to the embodiment includes a peripheral sensor group 1, a processing device 3, a storage device 4, and a vehicle sensor group 5. The own-position estimation device according to the embodiment is mounted in a vehicle V (see FIG. 2) and estimates the position of the vehicle V.

In the embodiment, the position and attitude angle with a total of three degrees of freedom on a two-dimensional plane are estimated, the three degrees of freedom including: the position (X coordinate [m]) in the east-west direction (X-axis direction) and the position (Y coordinate [m]) in the north-south direction (Y-axis direction) which are the estimated own position of the vehicle V; and the azimuth angle θ (yaw angle [rad]) of the vehicle which is attitude angle information.

The peripheral sensor group 1 includes, for example, multiple laser range finders (LRFs) 101, 102 each configured to detect the distance to a target by using reflection of laser light casted on the target and multiple cameras 201, 202 each configured to capture a digital image which can be subjected to image processing. As described above, the peripheral sensor group 1 includes multiple sensors which detect landmarks present around the vehicle V.

Figure 2:
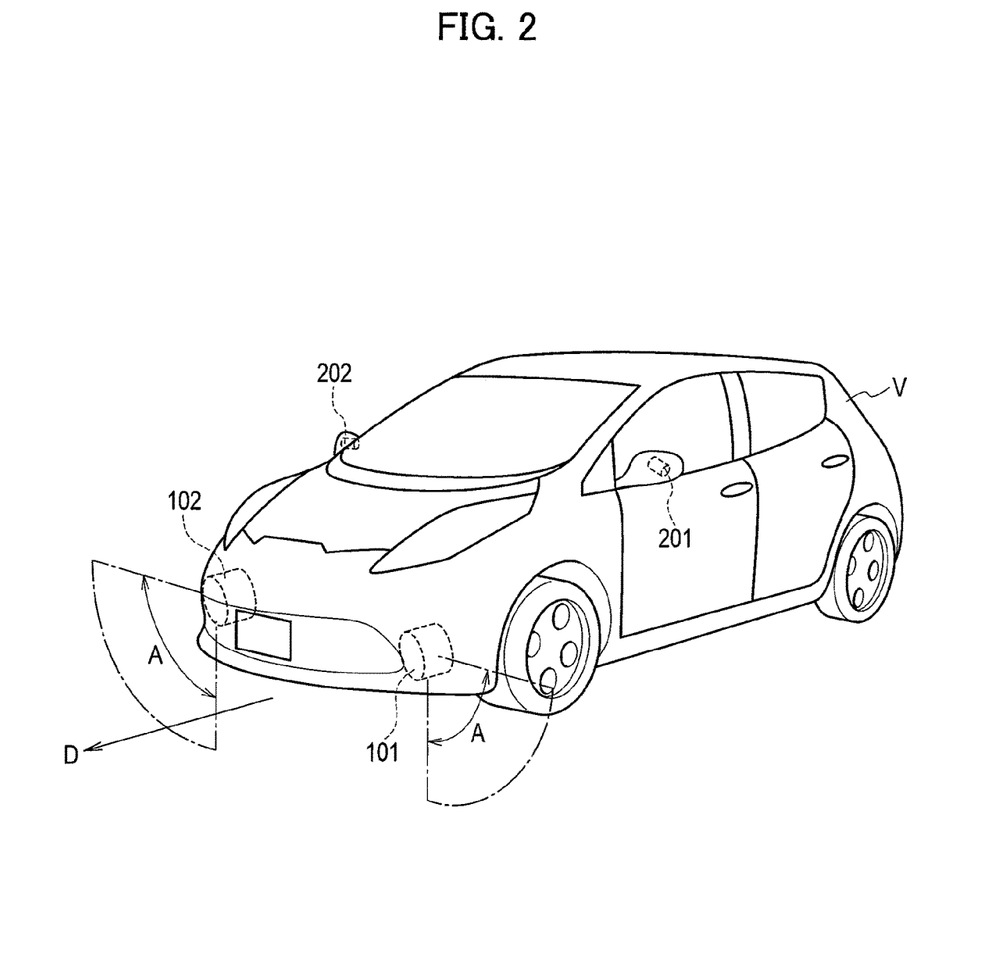
FIG. 2 is an example illustrating laser range finders and cameras mounted in a vehicle.

FIG. 2 is an example illustrating a state where the peripheral sensor group 1 is mounted in the vehicle V. The LRFs 101, 102 can be mounted, for example, near left and right front fenders of the vehicle V. For example, the LRFs 101, 102 each perform scanning within a predetermined scanning angle θ (for example, 90°) with a turning axis of scanning extending in a front-rear direction D of the vehicle V such that trajectories of the emitted laser light form a plane perpendicular to a road surface. The LRFs 101, 102 can thereby detect landmarks such as curbs present in a left-right direction of the vehicle V. The LRFs 101, 102 output the shapes of the detected landmarks one after another to the processing device 3 as detection results.

For example, the cameras 201, 202 can be mounted in left and right door mirrors of the vehicle V. The cameras 201, 202 capture images by using, for example, solid state imaging elements such as CCDs or CMOSs. The cameras 201, 202 capture, for example, images of the road surface on lateral sides of the vehicle V. The cameras 201, 202 output the captured images to the processing device 3 one after another.

The storage device 4 is a map information storage configured to store map information 41 including the positions of landmarks present around roads. The storage device 4 can be formed of a semiconductor memory, a magnetic disk, or the like. The landmarks recorded in the map information 41 include, for example, road surface signs indicating stop lines, pedestrian crossings, pedestrian crossing ahead signs, section lines, and the like, structures such as curbs, and various installations which can be detected by the peripheral sensor group 1. In the map information 41, landmarks which actually have certain heights such as curbs are also described only by position information on a two-dimensional plane. In the map information 41, the position information on each of curbs, white lines, and the like is defined by a collection of pieces of straight line information having two-dimensional information on both ends thereof. In the map information 41, when a shape of a landmark in an actual environment is a curve, the landmark is described as pieces of straight line information on the two-dimensional plane approximately drawing the curve by polygonal lines.

The vehicle sensor group 5 includes a GPS receiver 51, an accelerator sensor 52, a steering sensor 53, a brake sensor 54, a vehicle speed sensor 55, an acceleration sensor 56, a wheel speed sensor 57, and other sensors 58 such as a yaw rate sensor. The sensors 51 to 58 are connected to the processing device 3 and output various detection results to the processing device 3 one after another. The processing device 3 can calculate an approximant position of the vehicle V in the map information 41 by using the detection results of the vehicle sensor group 5 and calculate odometry indicating the movement amount of the vehicle V in a unit time.

The processing device 3 includes a landmark position detector 31, a movement amount detector 32, a landmark position accumulator 33, a straight line extractor 34, a landmark position selector 35, and an own-position estimator 36. The processing device 3 can be formed of, for example, a microcontroller which is an integrated circuit including a central processing unit (CPU), a memory, an input-output I/F, and the like. In this case, the multiple information processors (31 to 36) forming the processing device 3 are implemented by the CPU executing a computer program installed in advance in the microcontroller. Parts forming the processing device 3 may be formed of an integral piece of hardware or separate pieces of hardware. The microcontroller may also serve as an electronic control unit (ECU) used for other control associated with the vehicle V such as, for example, automatic driving control.

The landmark position detector 31 detects the positions of landmarks present around the vehicle V relative to the vehicle V, based on the detection results of at least one of the LRFs 101, 102 and the cameras 201, 202. The positions detected by the landmark position detector 31 are positions in a vehicle coordinate system. The vehicle coordinate system is, for example, a system in which the center of the rear axle of the vehicle V is set as an origin, a forward direction is set as a positive direction of the x-axis, a leftward direction is set as a positive direction of the y-axis, and an upward direction is set as a positive direction of the z-axis. Moreover, a formula for conversion from the coordinate systems of the LRFs 101, 102 and the cameras 201, 202 to the vehicle coordinate system is set in advance in the landmark position detector 31. Parameters of road surfaces in the vehicle coordinate system are similarly set.

The movement amount detector 32 detects the odometry which is the movement amount of the vehicle V in the unit time, based on detection result information of at least one of the sensors included in the vehicle sensor group 5. The movement amount of the vehicle V is detected as a movement amount in an odometry coordinate system. The landmark position accumulator 33 accumulates, as pieces of landmark position data, the positions of the landmarks detected by the landmark position detector 31 in the past at predetermined intervals, based on the movement amount detected by the movement amount detector 32.

The straight line extractor 34 extracts pieces of straight line information by using the pieces of landmark position data accumulated in the landmark position accumulator 33. The landmark position selector 35 selects the pieces of landmark position data from straight lines indicated by the pieces of straight line information extracted by the straight line extractor 34, based on the angles of 90° or smaller formed by the combinations of the intersecting straight lines. The own-position estimator 36 estimates the position of the vehicle V by matching the pieces of landmark position data selected by the landmark position selector 35 and the positions of the landmarks in the map information 41.

The landmark position selector 35 sets the priorities of the pieces of straight line information such that the combinations of straight lines forming the angles of 90° or smaller are given a high priority in descending order of the formed angle. Then, the landmark position selector 35 selects the pieces of landmark position data in the descending order of the priorities set for the pieces of straight line information. Specifically, the landmark position selector 35 selects, from the pieces of landmark position data accumulated in the landmark position accumulator 33, the pieces of landmark position data corresponding to pieces of straight line information on at least the combination of the intersecting straight lines forming the largest angle among the angles of 90° or smaller formed by combinations of the intersecting straight lines.

The landmark position selector 35 sets a high priority to each piece of straight line information in descending order of time of obtaining the corresponding piece of landmark position data. Then, the landmark position selector 35 selects the pieces of landmark position data in the descending order of the priorities set for the pieces of straight line information. The priority set for each piece of straight line information is changed from time to time based on the time of obtaining the corresponding pieces of landmark position data and the angle formed by the straight line which is an extended line of the piece of straight line information.

The landmark position accumulator 33 determines the pieces of landmark position data to be accumulated based on the priority of each piece of straight line information set by the landmark position selector 35. Specifically, the landmark position accumulator 33 preferentially accumulates the pieces of landmark position data corresponding to the piece of straight line information with a high priority, and preferentially deletes the pieces of landmark position data corresponding to the piece of straight line information with a low priority.

Figure 3:
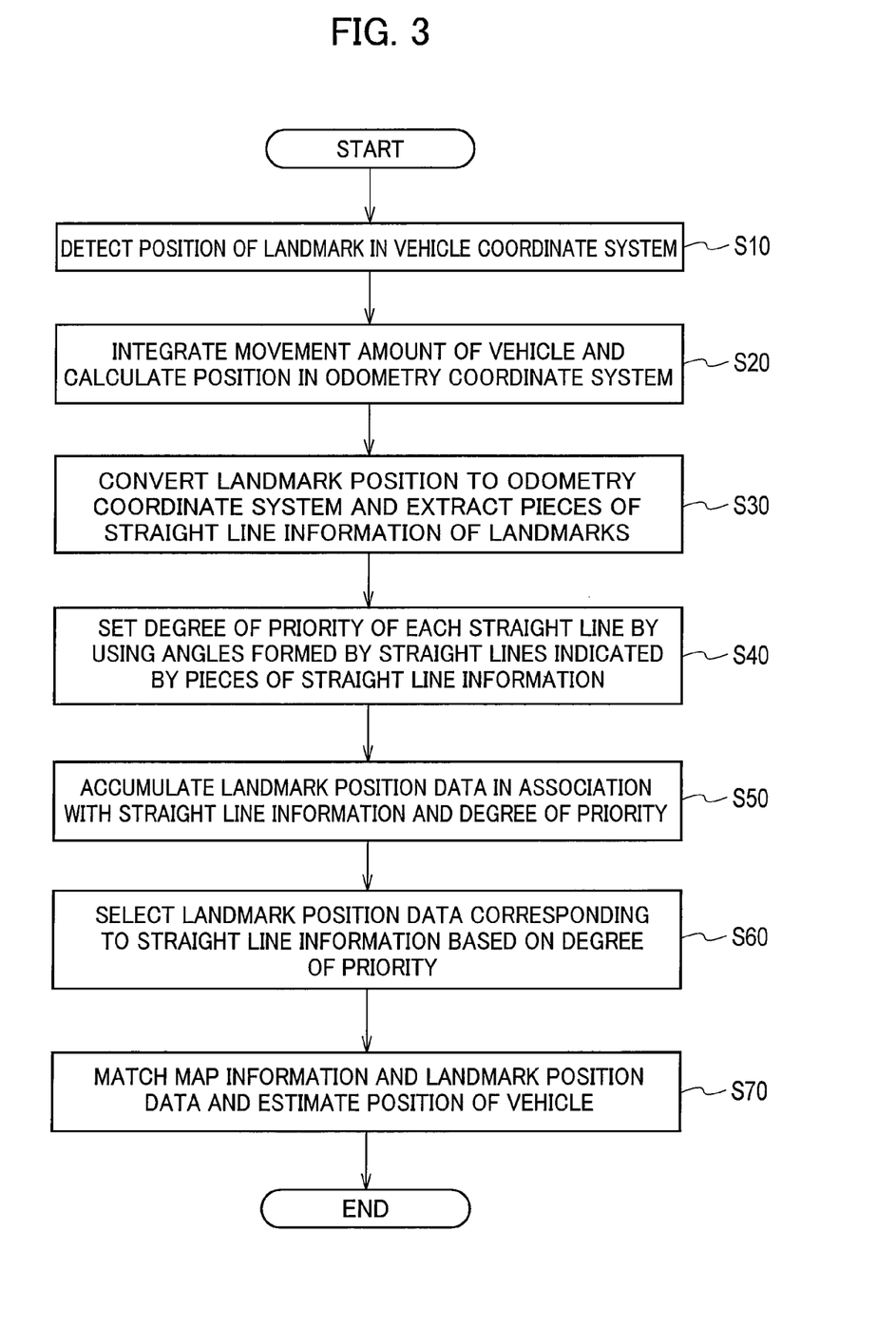
FIG. 3 is a flowchart explaining a processing flow of the own-position estimation device according to the embodiment of the present invention.

(Own-position Estimation Method) An example of an own-position estimation method using the own-position estimation device according to the embodiment is described with reference to the flowchart of FIG. 3.

First, in step S10, the landmark position detector 31 detects the position of each landmark around the vehicle V, based on the detection results of the peripheral sensor group 1. The landmark position detector 31 obtains the detection results of the LRFs 101, 102 and the cameras 201, 202 and detects the positions of the road surface signs such as section lines and stop lines and structures such as curbs and buildings in the vehicle coordinate system.

Figure 4:
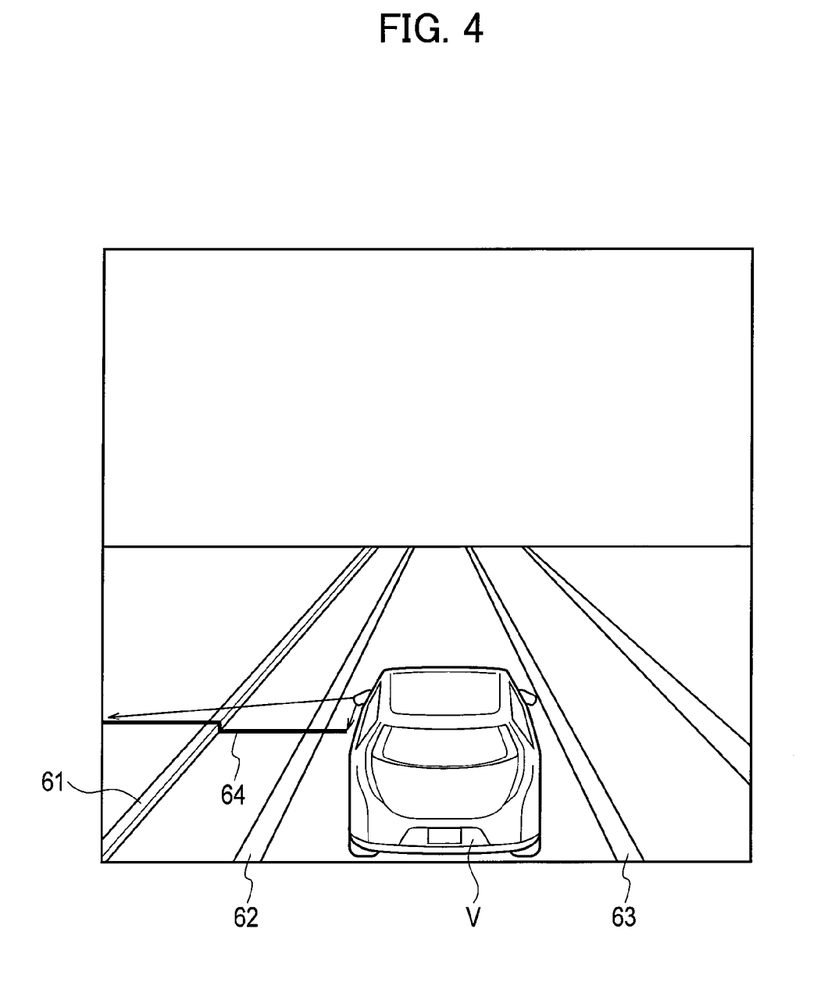
FIG. 4 is an example illustrating an environment in which the vehicle mounted with the own-position estimation device according to the embodiment of the present invention travels.
Figure 5A:
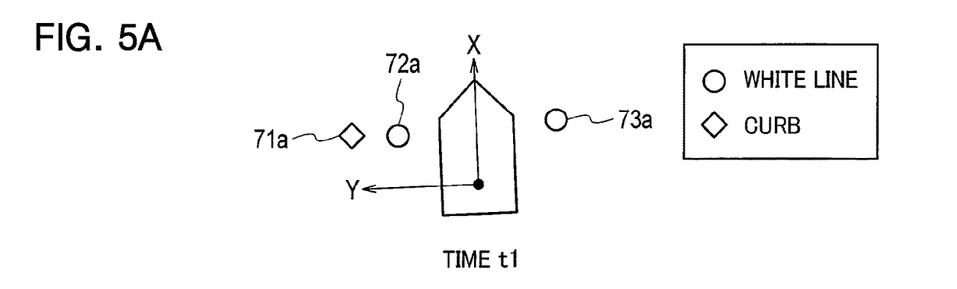
FIGS. 5A-5D are views explaining a region specified by a region specifier included in the own-position estimation device according to the embodiment of the present invention.
Figure 5B:
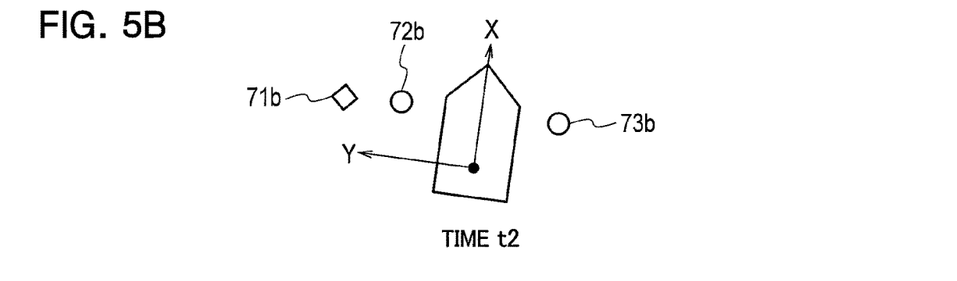
Figure 5C:
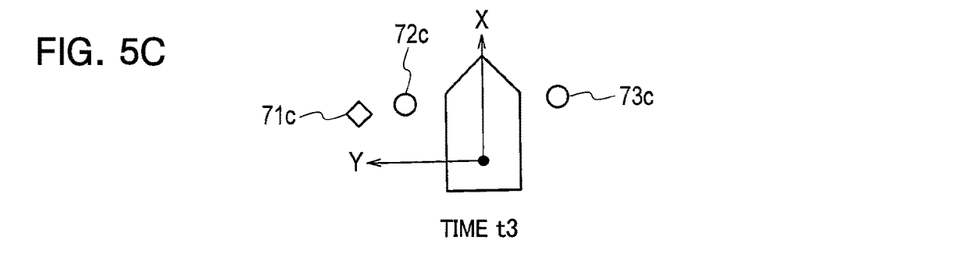
Figure 5D:
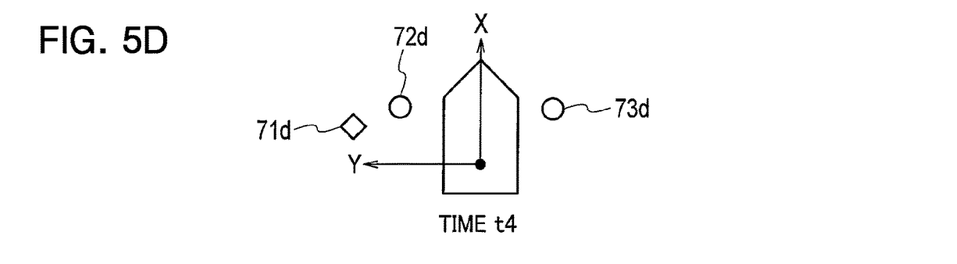

FIG. 4 is an example illustrating an environment in which the vehicle V travels when performing the own-position estimation. In the example illustrated in FIG. 4, the laser light emitted from the LRF 101 is casted on a road surface including a curb 61 as illustrated by a line 64. The landmark position detector 31 extracts a position where a shape changes greatly as the position of the curb 61, by using the direction and distance of the casted laser light, and detects the position (x, y, z) thereof in the vehicle coordinate system. Since it is possible to assume that the road surface is constantly present in the vertically downward direction of the LRFs 101, 102, the curb can be detected by comparing the height of each point with the height of the road surface and extracting a point of great change in height.

Moreover, the landmark position detector 31 detects white lines 62, 63 present on both sides of the vehicle V, by using luminance information of images captured by the cameras 201, 202. For example, the landmark position detector 31 can detect a pattern of luminance change in which the luminance changes from dark to light and then to dark, in grayscale images captured by the cameras 201, 202 and thereby detect the centers of light portions as the white lines 62, 63. The positions (x, y, z) of the white lines 62, 63 in the vehicle coordinate system can be detected by using positional relationships between the road surface and the cameras 201, 202. Height information (z-axis component) of the positions (x, y, z) in the vehicle coordinate system detected in step S10 is excluded and the positions are hereafter handled as two-dimensional data.

FIGS. 5A to 5D are diagrams illustrating the position 71 of the curb 61 and the positions 72, 73 of the white lines 62, 63 in the vehicle coordinate system which are detected by the landmark position detector 31 in a period from time t1 to t4 in the example illustrated in FIG. 4. The time t1 is the earliest time and the time t4 is the latest time.

In step S20, the movement amount detector 32 integrates the movement amount of the vehicle V calculated based on the detection results of the vehicle sensor group 5 to calculate the position of the vehicle V in the odometry coordinate system. The odometry coordinate system may be, for example, a system in which the position of the vehicle V at the time when the own-position estimation device is turned on or when processing is reset is set as an origin and the azimuth angle of the vehicle V at this time is set as 0°. The integration of the movement amount of the vehicle V is performed in the odometry coordinate system.

Figure 6:
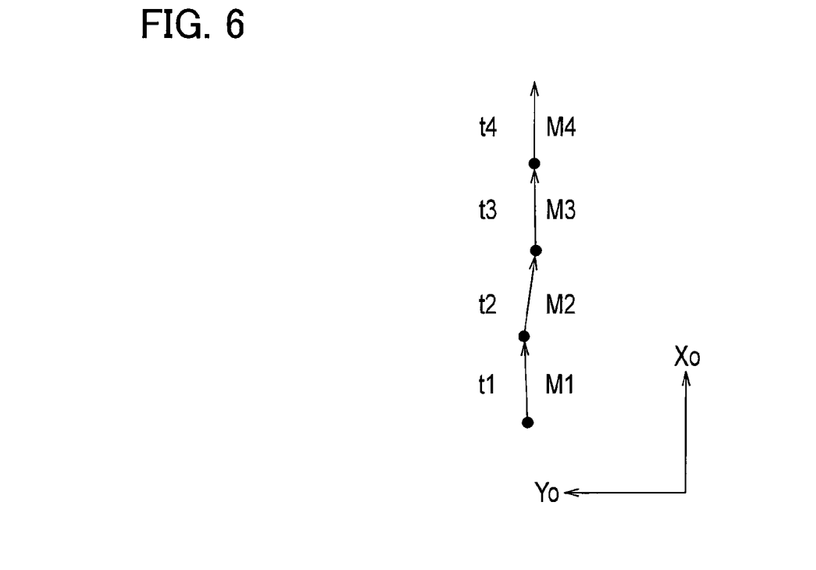
FIG. 6 is a diagram explaining processing performed by a landmark position detector included in the own-position estimation device according to the embodiment of the present invention.

FIG. 6 is a diagram illustrating the result of integrating the movement amount of the vehicle V calculated based on the detection results of the vehicle sensor group 5 in the example illustrated in FIGS. 5A to 5D. The movement amount detector 32 thereby calculates the position (Xo, Yo) of the vehicle V in the odometry coordinate system.

Figure 7:
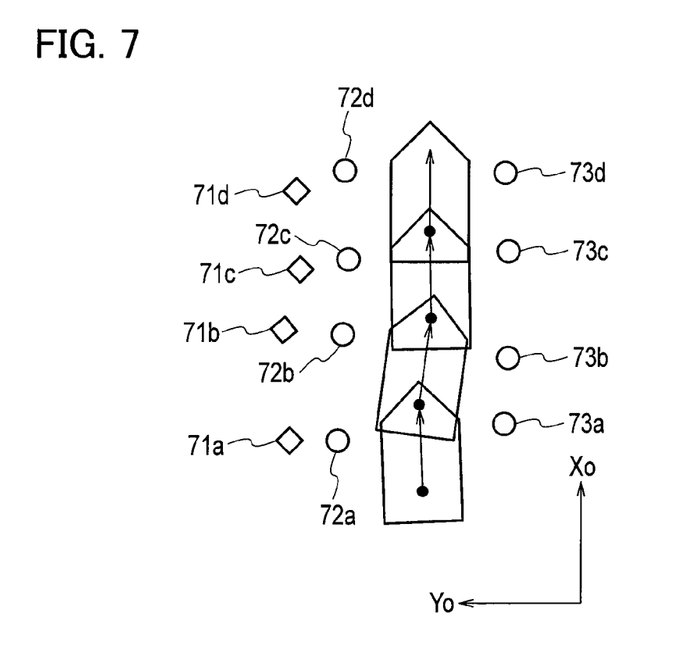
FIG. 7 is a diagram explaining processing performed by a movement amount detector included in the own-position estimation device according to the embodiment of the present invention.

FIG. 7 is a diagram illustrating the pieces of landmark position data converted to pieces of data in the odometry coordinate system in the examples illustrated in FIGS. 5A to 5D and 6. The landmark position accumulator 33 converts the position of each landmark detected in step S10 to a piece of data in the odometry coordinate system based on the movement amount detected in step S20 and accumulates the piece of converted data as the piece of landmark position data.

In step S30, the straight line extractor 34 extracts each piece of straight line information by using the pieces of landmark position data accumulated in the landmark position accumulator 33. The straight line extractor 34 extracts a straight line by using the pieces of landmark position data obtained in a period from time t0 to t0+Δt, where Δt is a unit time. The number of pieces of landmark position data obtainable in the unit time Δt is determined depending on sampling periods of the LRFs 101, 102 and the cameras 201, 202. Moreover, the straight line extractor 34 can determine whether the position of each landmark is on the left side or the right side of the vehicle V by determining whether the value of the y coordinate in the vehicle coordinate system is positive or negative. Accordingly, the straight line extractor 34 groups the pieces of landmark position data to pieces of data on the right side and pieces of data on the left side and then performs parameter estimation of each straight line.

Figure 8:
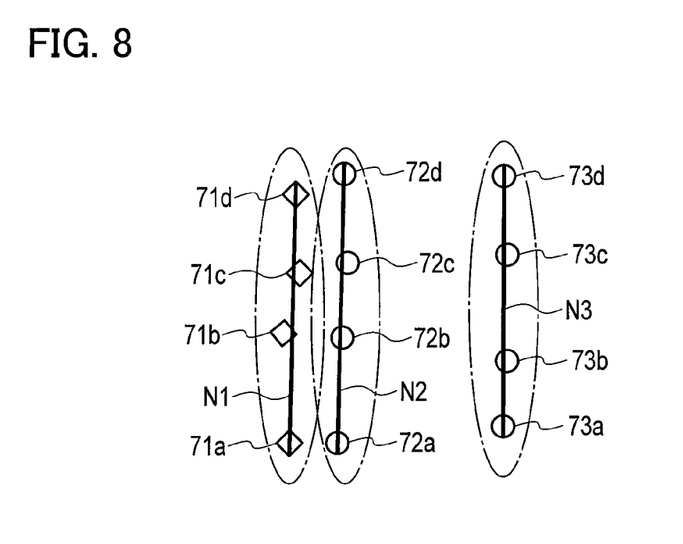
FIG. 8 is a diagram explaining processing performed by a straight line extractor included in the own-position estimation device according to the embodiment of the present invention.

FIG. 8 is a diagram illustrating pieces of straight line information N1, N2, N3 extracted by the straight line extractor 34 in the example illustrated in FIG. 7. Point clouds indicated by the pieces of landmark position data are two-dimensional information. Accordingly, the straight line extractor 34 can estimate each straight line by applying a straight line ax+by+c=0 to points pi=(xi, yi) detected as the white line or the curb and obtaining optimal parameters a, b, c. The straight line extractor 34 obtains the sum of distances between the estimated straight line and the respective points used for the estimation and, when the sum is equal to or greater than a predetermined threshold, does not extract the estimated straight line as the piece of straight line information. When the sum is less than the threshold, the straight line extractor 34 obtains points on the straight line closest to the respective points used for the estimation, selects two of the obtained points between which the distance is greatest as end points, and extracts the selected two points as the end points of the piece of straight line information. Points 71a and 71d are extracted as the end points of the piece of straight line information N1, points 72a and 72d are extracted as the end points of the piece of straight line information N2, and points 73a and 73d are extracted as the end points of the piece of straight line information N3. The landmark position accumulator 33 accumulates the point cloud (landmark position data) used for the estimation of the straight line, the pieces of straight line information, and the obtained time t0+Δt in association with one another.

In step S40, the landmark position selector 35 reads the end points of the pieces of straight line information accumulated in the landmark position accumulator 33 and obtains the angles of 90° or smaller formed by straight lines which pass the end points of the pieces of straight line information and which are extended lines of the pieces of straight line information. Since each piece of straight line information is accumulated as two end points in the landmark position accumulator 33, when the two end points are expressed as ps=(xs, ys), pe (xe, ye), the direction vector of the piece of straight line information can be expressed as V=(xe−xs, ye−ys).

Moreover, when the direction vectors of certain two pieces of straight information are expressed as Vi and Vj, an angle argij of 90° or smaller formed by extended lines of the two pieces of straight line information can be obtained as follows:

$$aij=\cos-1((Vi \cdot Vj)/(|Vi||Vj|))$$

(when aij exceeds 90 degrees) argij=180−aij
(when aij is 90 degrees or smaller) argij=aij.

The landmark position selector 35 sets the priorities of the pieces of straight line information such that the combinations of straight lines forming the angles arg are given a high priority in descending order of the formed angle. When the priorities of the pieces of straight line information based on the angles are the same, the landmark position selector 35 may set a high priority to each piece of straight line information in the descending order of the time of obtaining the corresponding piece of landmark position data.

Figure 9:
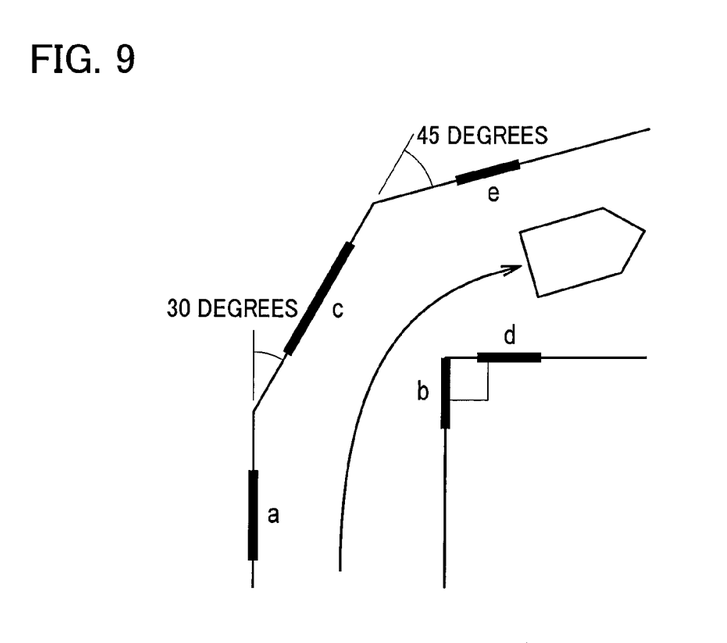
FIG. 9 is an example illustrating pieces of straight line information extracted by the straight line extractor while the vehicle is traveling.
Figure 10:
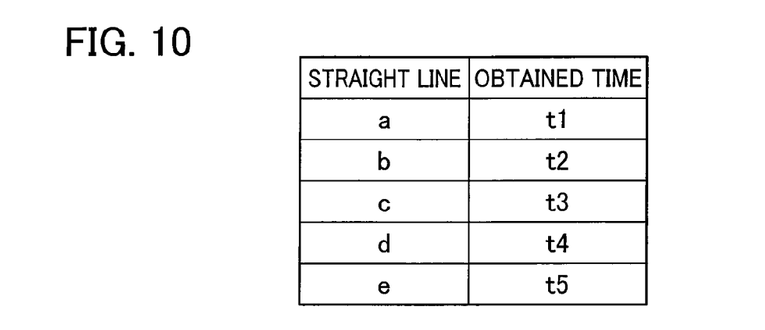
FIG. 10 is a table illustrating the pieces of straight line information extracted by the straight line extractor and obtained times.
Figure 11:
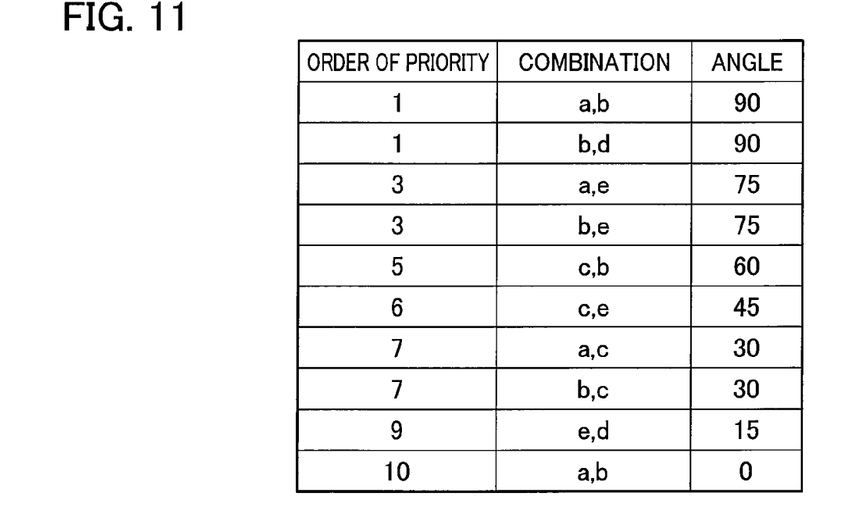
FIG. 11 is a table explaining a state where a priority is set for each combination of pieces of straight line information, based on angles formed by the intersecting straight lines.

FIG. 9 is a diagram explaining the case where five pieces of straight line information a to e are extracted by the straight line extractor 34 while the vehicle V is traveling. As depicted in FIG. 10, the pieces of straight line information a, b, c, d, and e are obtained at time t1, t2, t3, t4, and t5, respectively. The time t1 is the earliest time and the time t5 is the latest time. In this case, as illustrated in FIG. 11, the landmark position selector 35 first obtains combinations of the pieces of straight line information a to e and the angles of 90° or smaller formed by extended lines of the combinations of pieces of straight line information a to e, and sets the priorities for the combinations such that the combinations of straight lines forming the angles of 90° or smaller are given a high priority in descending order of the formed angle. The priorities of the respective combinations of the pieces of straight line information a to e are thereby determined as depicted in FIG. 11.

Figure 12:
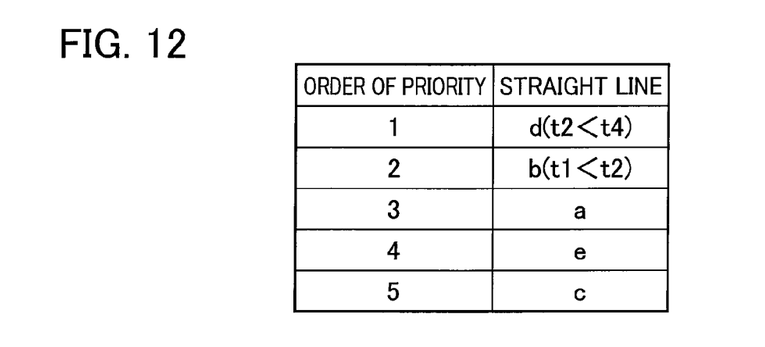
FIG. 12 is a table explaining a state where the priority is set for each piece of straight line information according to the obtained times and the angles formed by the intersecting straight lines.

In the state depicted in FIG. 11, the priority is set for each combination of pieces of straight line information. The landmark position selector 35 thus further sets the priority of each piece of straight line information such that a high priority is set to each piece of straight information in descending order of time of obtaining the piece of straight line information or the piece of landmark position data. For example, the times of obtaining the pieces of straight line information a, b, d which are set to have the highest priority in FIG. 11 are t1, t2, t4, respectively, in FIG. 10, and the time of obtaining the piece of straight line information d is thus the latest followed by b and a. Hence, the priority of the piece of straight line information d is set to be highest followed by b and a as illustrated in FIG. 12. Furthermore, the priorities of the pieces of straight line information c and e which are set to be the second highest following the priorities of the pieces of straight line information a, b, d in FIG. 11 are determined such that the priority of the piece of straight line information e is higher than c.

In step S50, the landmark position accumulator 33 stores the pieces of straight line information and the pieces of landmark position data in association, according to the priorities set in step S40. When the storage capacity of the landmark position accumulator 33 is limited, the landmark position accumulator 33 may delete the pieces of straight line information in the ascending order of priority.

In step S60, the own-position estimator 36 matches the pieces of landmark position data accumulated in the landmark position accumulator 33 and the positions of the landmarks in the map information 41 to estimate the position of the vehicle V. Specifically, the own-position estimator 36 estimates the position and attitude angle of the vehicle V with a total of three degrees of freedom which include the position (X coordinate) of the vehicle V in the east-west direction, the position (Y coordinate) of the vehicle V in the north-south direction, and the azimuth angle θ (yaw angle θ) of the vehicle V.

An ICP (Interactive Closest Point) algorithm can be used for the matching performed in step S50. In this case, the own-position estimator 36 performs matching for, for example, section lines, out of the positions of the landmarks included in the map information 41, by using the end points at both ends of each section line as evaluation points. Moreover, the closer the piece of landmark position data is to the vehicle V (peripheral sensor group 1), the less the effect of the odometry error is. Accordingly, the own-position estimator 36 can increase the number of evaluation points for areas near the vehicle V by performing linear interpolation and reduce the number of evaluation points for areas far from the vehicle V.

As described above, the own-position estimation device according to the embodiment extracts the pieces of straight line information by using the pieces of landmark position data and selects the pieces of landmark position data necessary for uniquely estimating the own position, based on the angles formed by the extended lines of the extracted pieces of straight line information. The own-position estimation device according to the embodiment can thereby improve the accuracy of the own-position estimation of the vehicle. Moreover, since the own-position estimation device according to the embodiment extracts the pieces of straight line information based on the landmarks around the vehicle and extracts at least one combination of extracted pieces of straight line information whose extended lines intersect each other, the own-position estimation device can uniquely estimate the own position.

Furthermore, the own-position estimation device according to the embodiment can perform the own-position estimation by using the pieces of landmark position data corresponding to the pieces of straight line information on the combination of the intersecting straight lines forming the largest angle among the angles of 90° or smaller formed by combinations of the intersecting straight lines. The own-position estimation device according to the embodiment can thereby select the most reliable piece of data from the pieces of landmark position data necessary for uniquely estimating the own position.

Moreover, the own-position estimation device according to the embodiment sets the priorities of the pieces of straight line information such that the combinations of straight lines forming the angles of 90° or smaller are given a high priority in descending order of the formed angle. The priorities are thereby set for the pieces of landmark position data in the descending order of usefulness in the own-position estimation and the accuracy of the own position estimation of the vehicle can be improved.

Furthermore, the own-position estimation device according to the embodiment sets a high priority to each piece of straight line information in descending order of time of obtaining the corresponding piece of landmark position data. The own-position estimation device according to the embodiment can thereby select a recent piece of landmark position data which contributes greatly to the own-position estimation, and improve the accuracy of the own-position estimation of the vehicle.

Moreover, in the own-position estimation device according to the embodiment, the landmark position accumulator 33 determines the pieces of landmark position data to be accumulated, based on the set priorities. The own-position estimation device according to the embodiment can thereby delete the pieces of data with low priorities when deletion of data becomes necessary due to reasons such as limited storage capacity. Accordingly, the own-position estimation device according to the embodiment can keep holding the pieces of landmark position data necessary for uniquely estimating the own position.

Although the present invention has been described above by using the aforementioned embodiment, it should not be understood that the description and drawings forming part of this disclosure limit the present invention. From this disclosure, various alternative embodiments, examples, and operations techniques will be found by those skilled in the art. The present invention includes various embodiments and the like which are not described herein such as configurations mutually adopting the aforementioned configurations, as a matter of course. Accordingly, the technical scope of the present invention should be determined only by the matters specifying the invention in the scope of claims regarded as appropriate based on the aforementioned description.

The present invention can provide the own-position estimation device and the own-position estimation method which can improve the accuracy of the own-position estimation by selecting the pieces of data used for the own-position estimation based on the angles formed by the straight lines obtained by using the landmarks in the periphery.

REFERENCE SIGNS LIST

V vehicle
4 storage device (map information storage)
31 landmark position detector
32 movement amount detector
33 landmark position accumulator
34 straight line extractor
35 landmark position selector
36 own-position estimator
41 map information

The invention claimed is:

1. An own-position estimation device comprising:
one or more peripheral sensor mounted in a vehicle and configured to detect positions of landmarks present around the vehicle relative to the vehicle;
one or more vehicle sensor configured to detect a movement amount of the vehicle; and
a controller configured to:
accumulate the positions of the landmarks relative to the vehicle detected by the one or more peripheral sensor as landmark position data by coordinates based on the movement amount detected by the one or more vehicle sensor;
extract straight lines from the landmark position data accumulated at a plurality of times;
select pieces of the landmark position data based on angles formed by intersecting ones of the extracted straight lines;
store map information including positions of landmarks; and
estimate a position of the vehicle by matching the selected pieces of the landmark position data and the positions of the landmarks in the map information.

2. The own-position estimation device according to claim 1, wherein the controller selects the pieces of the landmark position data corresponding to pieces of straight line information on at least a combination of the intersecting straight lines forming a largest angle among angles of 90° or smaller formed by combinations of the intersecting straight lines.

3. The own-position estimation device according to claim 1, wherein the controller sets priorities of pieces of straight line information such that the greater the angles formed by the intersecting ones of the straight lines equal to or less than 90° are, the higher the priority is set to combinations of the intersecting ones of the straight lines, and selects the pieces of the landmark position data in a descending order of the priorities set for the pieces of straight line information.

4. The own-position estimation device according to claim 3, wherein the controller sets priorities of the pieces of straight line information such that the later times of obtaining the pieces of the landmark position data are, the higher the priority is set to the pieces of straight line information corresponding to the pieces of the landmark position data, and selects the pieces of the landmark position data in a descending order of the priorities set for the pieces of straight line information.

5. The own-position estimation device according to claim 3, wherein the controller determines the pieces of the landmark position data to be accumulated based on the priorities.

6. An own position estimation method comprising:
detecting positions of landmarks present around a vehicle relative to the vehicle by one or more peripheral sensor mounted in the vehicle;
detecting a movement amount of the vehicle by one or more vehicle sensors;
accumulating the positions of the landmarks relative to the vehicle detected by the one or more peripheral sensor as landmark position data by coordinates based on the movement amount detected by the one or more vehicle sensors;
extracting straight lines from the landmark position data accumulated at a plurality of times;
selecting pieces of the landmark position data based on angles formed by intersecting ones of the extracted straight lines; and
estimating a position of the vehicle by matching the selected pieces of the landmark position data and positions of landmarks in map information.

* * * * *